US012608445B2

(12) United States Patent
Troiani et al.

(10) Patent No.: US 12,608,445 B2
(45) Date of Patent: Apr. 21, 2026

(54) ASSESSING MACHINE LEARNING BIAS USING MODEL TRAINING METADATA

(71) Applicant: Cisco Technology, Inc., San Jose, CA (US)

(72) Inventors: Chiara Troiani, Cheseaux-sur-Lausanne (CH); Aviva Vaknin, Jerusalem (IL); Frank Michaud, Pully (CH)

(73) Assignee: Cisco Technology, Inc., San Jose, CA (US)

( * ) Notice: Subject to any disclaimer, the term of this patent is extended or adjusted under 35 U.S.C. 154(b) by 494 days.

(21) Appl. No.: 17/580,061

(22) Filed: Jan. 20, 2022

(65) Prior Publication Data

US 2023/0229734 A1 Jul. 20, 2023

(51) Int. Cl.

| | |
|---|---|
| ***G06K 9/62*** | (2022.01) |
| ***G06F 18/214*** | (2023.01) |
| ***G06F 18/2413*** | (2023.01) |
| ***G06F 18/40*** | (2023.01) |
| ***G06N 20/00*** | (2019.01) |

(52) U.S. Cl.

CPC ........ *G06F 18/214* (2023.01); *G06F 18/2413* (2023.01); *G06F 18/40* (2023.01); *G06N 20/00* (2019.01)

(58) Field of Classification Search

CPC .... G06F 18/214; G06F 18/2413; G06F 18/40; G06N 20/00; G06N 3/08

See application file for complete search history.

(56) References Cited

U.S. PATENT DOCUMENTS

| | | | | |
|---|---|---|---|---|
| 10,747,989 | B2 | 8/2020 | Zou et al. | |
| 10,963,813 | B2 | 3/2021 | Chen | |
| 11,121,954 | B2 | 9/2021 | Vasseur et al. | |
| 11,144,616 | B2 | 10/2021 | Tan et al. | |
| 11,893,091 | B2 * | 2/2024 | Lillard | H04L 9/3247 |
| 2017/0236094 | A1 * | 8/2017 | Shah | H04L 9/3236 705/300 |
| 2019/0378192 | A1 * | 12/2019 | Fox | G06F 16/5866 |
| 2020/0151555 | A1 | 5/2020 | Kozhaya et al. | |
| 2020/0372304 | A1 * | 11/2020 | Kenthapadi | G06N 7/01 |
| 2020/0380049 | A1 * | 12/2020 | Pelleg | G06F 16/332 |
| 2021/0174142 | A1 * | 6/2021 | Han | G06N 3/0499 |
| 2021/0184958 | A1 | 6/2021 | Kolar et al. | |

(Continued)

OTHER PUBLICATIONS

Harwell, Drew, "Federal study confirms racial bias of many facial-recognition systems, casts doubt on their expanding use", Dec. 19, 2019, 3 pages, The Washington Post.

(Continued)

*Primary Examiner* — Oneal R Mistry
*Assistant Examiner* — Jongbong Nah
(74) *Attorney, Agent, or Firm* — Lee & Hayes, P.C.

(57) ABSTRACT

In one embodiment, a device receives a request for a machine learning model to make an inference about input data included in the request. The device retrieves metadata regarding training data used to train the machine learning model from a ledger associated with the machine learning model. The device assesses bias of the machine learning model by comparing the input data in the request to the metadata from the ledger. The device provides an indication of the bias of the machine learning model for display.

20 Claims, 9 Drawing Sheets

(56) References Cited

U.S. PATENT DOCUMENTS

| | | | | |
|---|---|---|---|---|
| 2022/0050921 | A1* | 2/2022 | LaFever | G16H 10/60 |
| 2022/0058513 | A1* | 2/2022 | John | G06V 10/7792 |

OTHER PUBLICATIONS

NG, Andrew, "MLOps: From Model-Centric to Data-Centric AI", online: https://www.deeplearning.ai/wp-content/uploads/2021/06/MLOps-From-Model-centric-to-Data-centric-AI.pdf, accessed Jan. 13, 2022, 29 pages.

"Seven types of data bias in machine learning", online: https://www.telusinternational.com/articles/7-types-of-data-bias-in-machine-learning, posted Feb. 4, 2021, accessed Jan. 12, 2022, 7 pages.

"NIST Proposes Approach for Reducing Risk of Bias in Artificial Intelligence", online: https://www.nist.gov/news-events/news/2021/06/nist-proposes-approach-reducing-risk-bias-artificial-intelligence, Jun. 22, 2021, 3 pages, National Institute of Standards and Technology, U.S. Department of Commerce.

Sixta, et al., "FairFace Challenge at ECCV 2020: Analyzing Bias in Face Recognition", online: https://arxiv.org/pdf/2009.07838.pdf, Dec. 2, 2020, 28 pages, arXiv:2009.07838v2.

* cited by examiner

ASSESSING MACHINE LEARNING BIAS USING MODEL TRAINING METADATA

TECHNICAL FIELD

The present disclosure relates generally to computer networks, and, more particularly, to assessing machine learning bias using model training metadata.

BACKGROUND

Interest in machine learning has increased considerably in recent years. From image recognition and analysis, to personal assistants, to diagnostic systems, and the like, machine learning is becoming more and more integral to many technologies. This trend is only expected to increase as machine learning techniques become more refined over time.

In general, generation of a machine learning model entails one or more training phases during which the model is trained using an existing dataset. For instance, in the case of image recognition, the training data may include many images depicting an object, thereby training the model to recognize that object in other images. However, if the training dataset is not carefully crafted, the resulting model can exhibit bias, leading to poor performance during use. Indeed, removing bias during model training has become its own body of study.

However, once a trained model is deployed for use, information about its training is often concealed. This can be due, for example, to data sovereignty or privacy concerns regarding the training data. For instance, medical images used to train a model may be protected by privacy laws from being disseminated. Consequently, any bias of the model will be difficult, if not impossible, to identify until it becomes noticeable during use.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
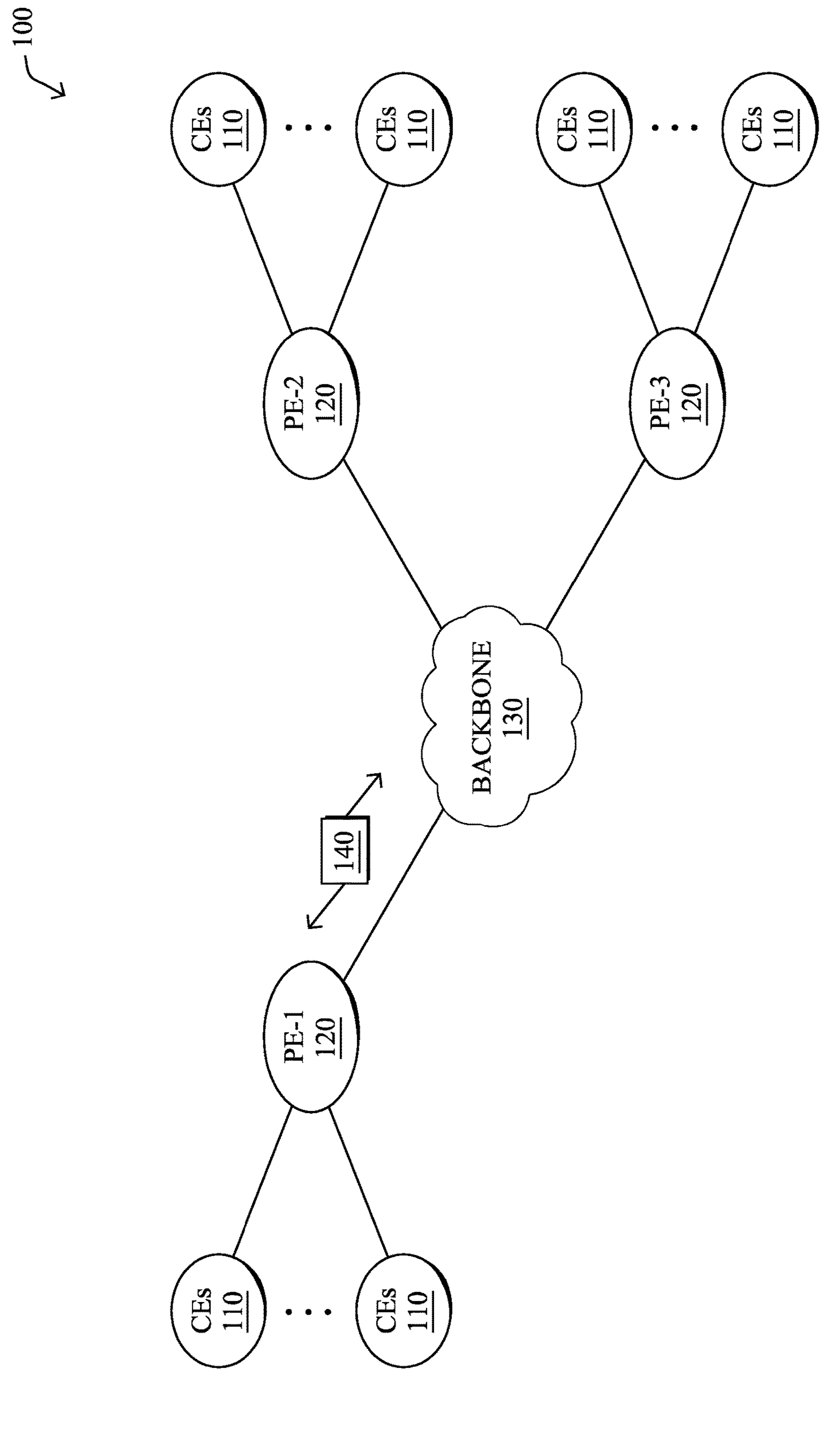
FIGS. 1A-1B illustrate an example communication network.

According to one or more embodiments of the disclosure, a device receives a request for a machine learning model to make an inference about input data included in the request. The device retrieves metadata regarding training data used to train the machine learning model from a ledger associated with the machine learning model. The device assesses bias of the machine learning model by comparing the input data in the request to the metadata from the ledger. The device provides an indication of the bias of the machine learning model for display.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective “size” of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or “AMI” applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/

Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a “Gold Package” Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
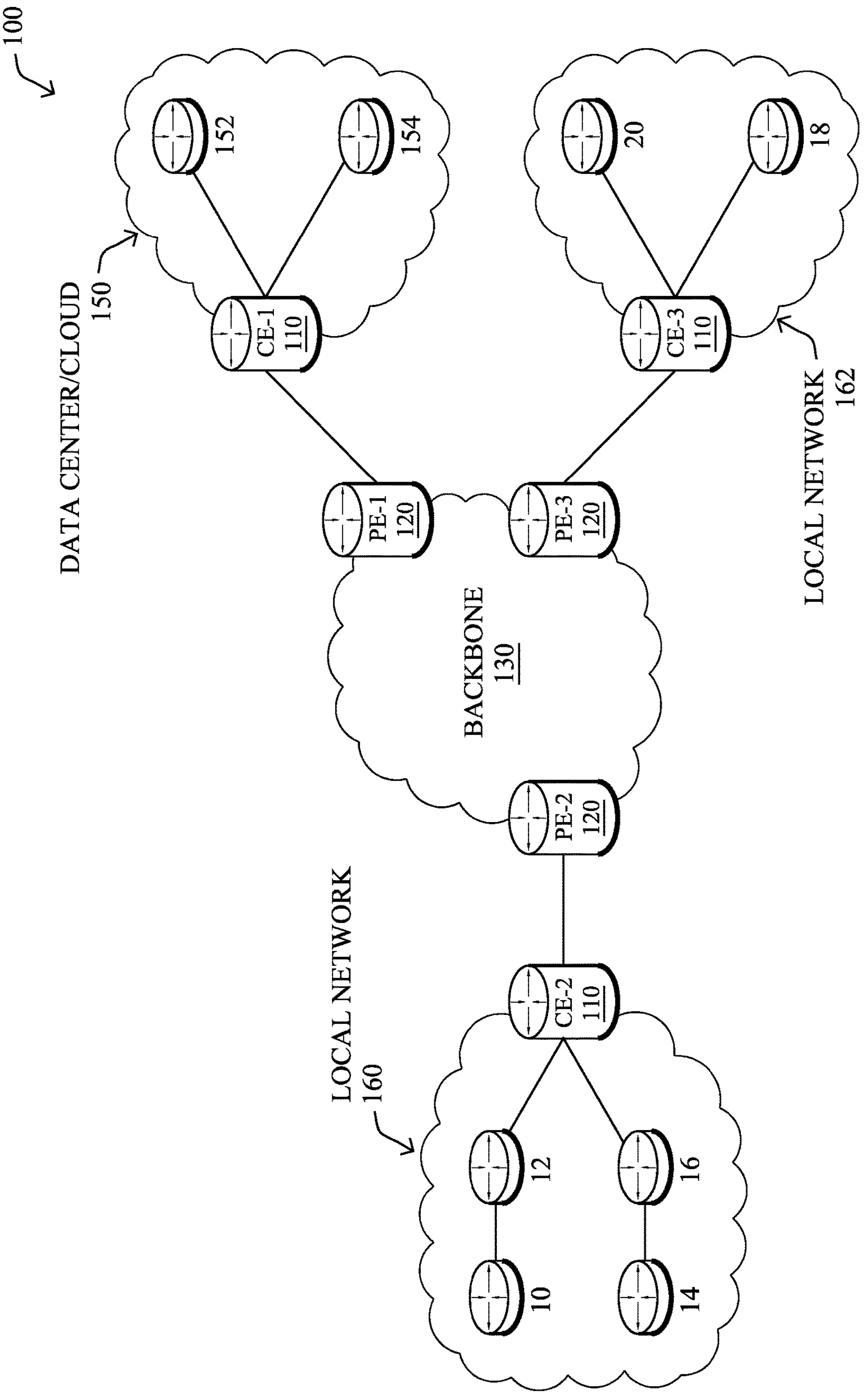

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
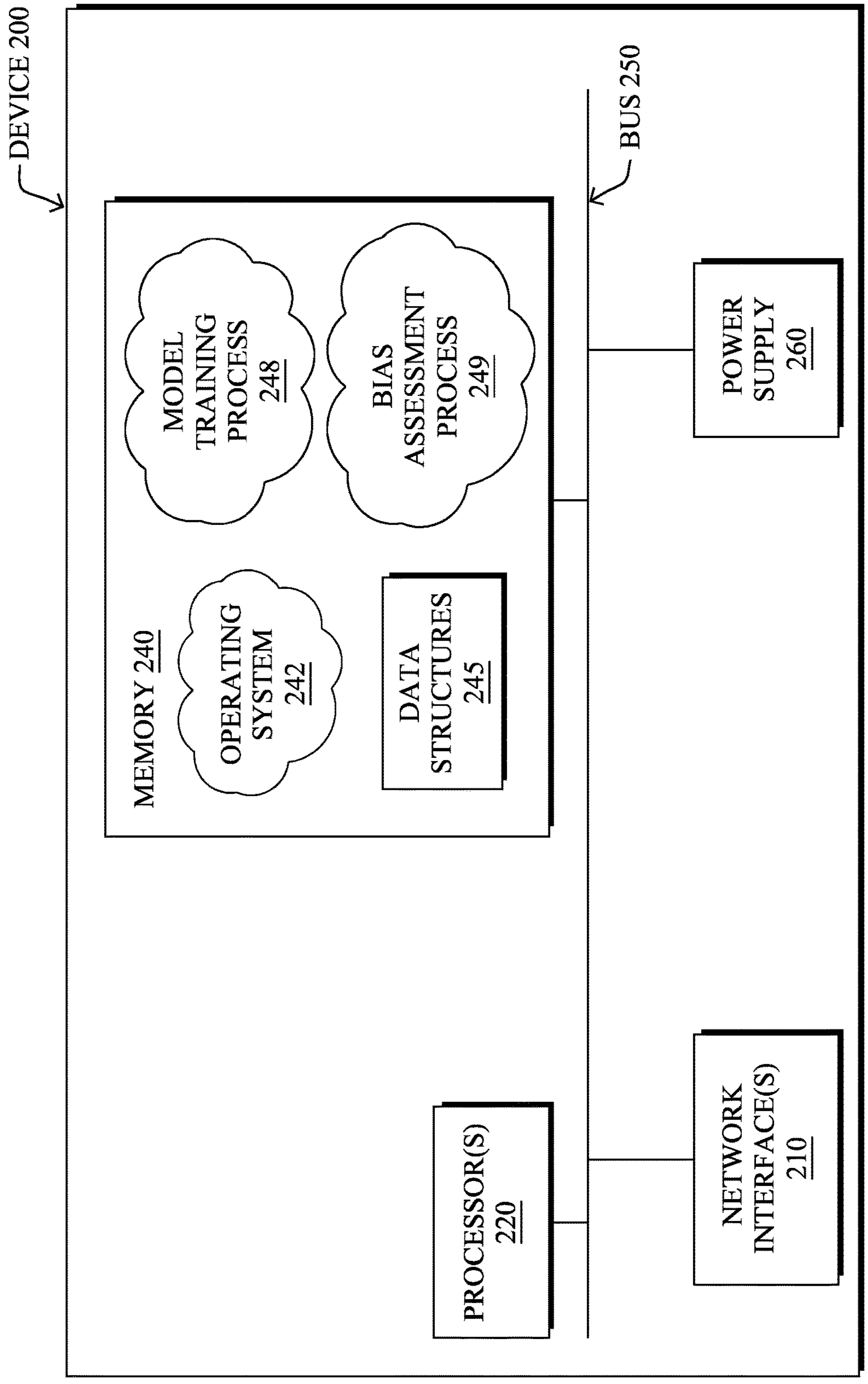
FIG. 2 illustrates an example device.

FIG. 2 is a schematic block diagram of an example device 200 (e.g., an apparatus) that may be used with one or more embodiments described herein, e.g., as any of the computing devices shown in FIGS. 1A-1B, such as PE routers 120, CE routers 110, nodes/devices 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a model training process 248 and/or a bias assessment process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, model training process 248 and/or bias assessment process 249 may also include computer executable instructions that, when executed by processor(s) 220, cause device 200 to perform the techniques described herein. To do so, in some embodiments, model training process 248 and/or bias assessment process 249 may leverage machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, model training process 248 may be responsible for training one or more supervised, unsupervised, or semi-supervised machine learning models. Generally, supervised learning entails the use of a training set of data that is used to train the model to apply labels to the input data. For example, the training data may include sample image data that has been labeled as depicting a particular condition or object. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that the model trained by model training process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

As noted above, bias is an ever-increasing concern when training a machine learning model. Generally, bias in machine learning refers to a condition whereby there is a discrepancy between the training data used to train a machine learning model and the conditions in the real-world in which the model is to be used. For instance, bias may be introduced due to any or all of the following reasons:

- Measurement Bias—e.g., using a different type of sensor to capture the training data than what is used to capture the input data for the model after deployment, capturing false readings in the training data (e.g., due to a faulty sensor), etc.
- Curation Bias—here, the training dataset may be selected in a way that inadvertently (or intentionally) excludes or misrepresents the real-world conditions. For instance, in the case of image recognition, including an overabundance of images of people of a particular race, gender, age, etc. could create bias in the resulting model.
- Etc.

Typically, issues regarding model bias are addressed during the model training phase. Indeed, model training often entails iteratively testing a generated model against a validation dataset, assessing its performance, and retraining the model, if necessary. This can also entail refining the training dataset used to retrain the model, if bias is discovered during this phase.

Despite the best efforts made during the training phase, bias can still be present in a machine learning model after deployment. The reason for any latent bias in the deployed model, though, is often difficult to pinpoint. This is due to the fact that insight into the training data used to train the machine learning model is frequently concealed from the end users of the model. Indeed, data privacy and data sovereignty requirements for the training data used to train the model may prevent the release of the training data to the end users of the machine learning model. Consequently, the end user may only encounter bias by happenstance and be unable to understand why the machine learning model is behaving the way that it is.

By way of example, there have been facial recognition models that exhibit facial color bias against certain races due to racial bias present in their training data (e.g., by overrepresenting white/Caucasian people in the training dataset to the exclusion of other races). Some studies have even found Asian and African-Americans up to one hundred times more likely to be misidentified than white men, depending on the machine learning model in use. With facial recognition being used for purposes of multi-factor authentication, policing, and the like, this presents significant concerns and one that is difficult, if not impossible, to quantify once deployed. For instance, one model may be quite capable of recognizing the faces of people of all races with the exception of Pacific Islanders, while another may be capable of recognizing the faces of people of all races with the exception of African-Americans. From the standpoint of an individual user, discerning between the biases of these two models may be nearly impossible, as there is not transparency into their respective training datasets.

Assessing Machine Learning Bias Using Model Training Metadata

The techniques introduced herein allow an end user of a machine learning model to review the bias of a machine learning model using a ledger of metadata captured regarding its training data. In some aspects, the ledger may be embedded directly into the model or as a distributed ledger, such as in a blockchain. In further aspects, the techniques herein may be used to control inference decisions, such as by using a different machine learning model, if the bias of the primary model exceeds a defined threshold.

Illustratively, the techniques described herein may be performed by hardware, software, and/or firmware, such as in accordance with model training process 248 and/or bias assessment process 249, which may include computer executable instructions executed by the processor 220 (or independent processor of interfaces 210) to perform functions relating to the techniques described herein.

Specifically, according to various embodiments, a device receives a request for a machine learning model to make an inference about input data included in the request. The device retrieves metadata regarding training data used to train the machine learning is model from a ledger associated with the machine learning model. The device assesses bias of the machine learning model by comparing the input data in the request to the metadata from the ledger. The device provides an indication of the bias of the machine learning model for display.

Figure 3:
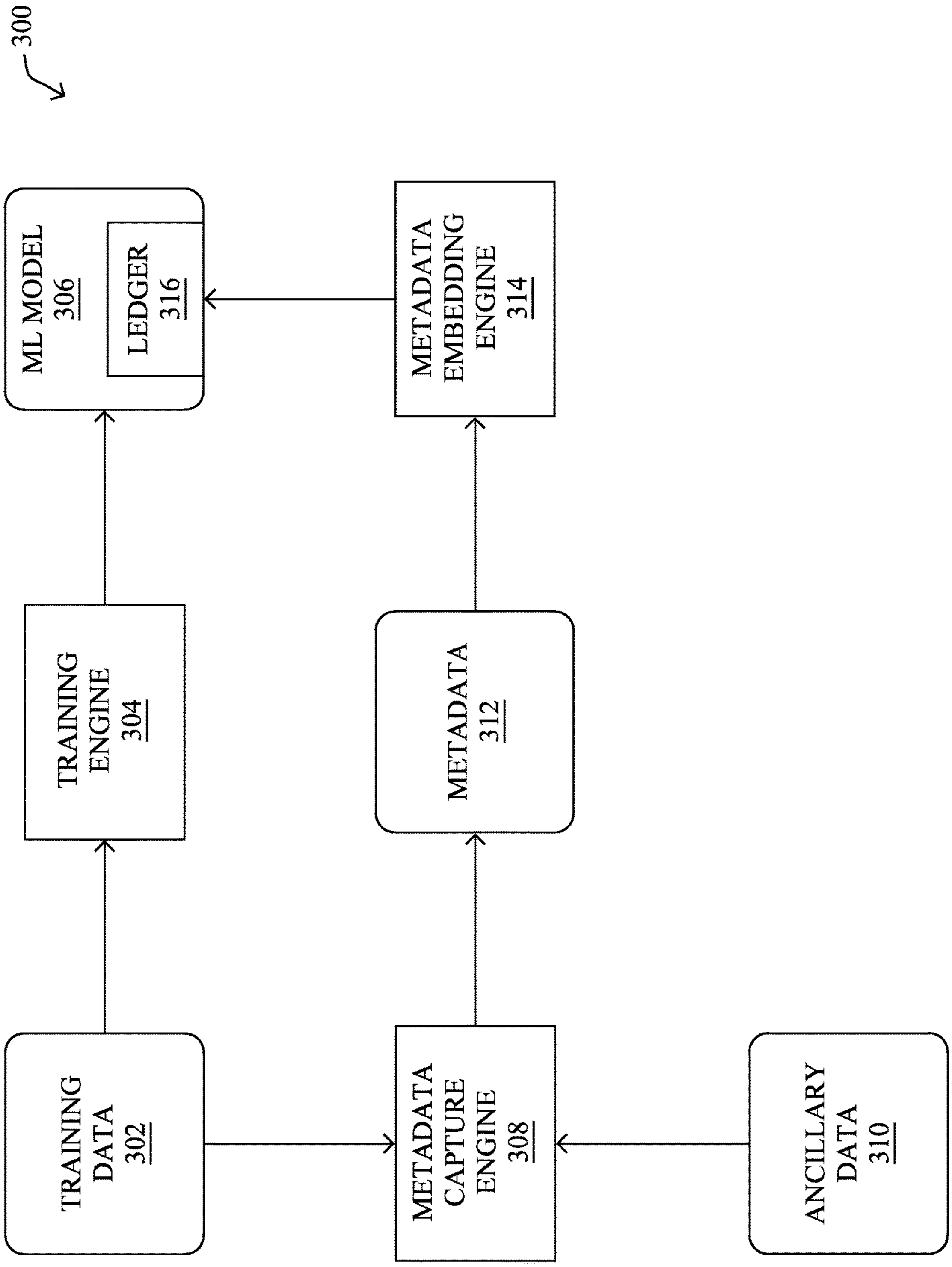
FIG. 3 illustrates an example architecture for training a machine learning model.

Operationally, FIG. 3 illustrates an example architecture 300 for training a machine learning model, according to various embodiments. As shown, architecture 300 may be used to implement a model training process, such as model training process 248. Such a model training process may include any or all of the following software components: a training engine 304, a metadata capture engine 308, and/or a metadata embedding engine 314. As would be appreciated, the functionalities of these components may be combined or omitted, as desired. In addition, these components may be implemented on a singular device or in a distributed manner, in which case the combination of executing devices can be viewed as their own singular device for purposes of executing the model training process (e.g., process 248).

As shown, training engine 304 may be configured to generate a machine learning (ML) model 306 based on training data 302. Depending on the intended use case for ML model 306, as well as its intended deployment environment, training data 302 and the type of ML model 306 trained may vary considerably. For instance, in the case of ML model 306 taking the form of an image classifier, training data 302 may include numerous images that depict one or more classification categories (e.g., classes) for which ML model 306 is trained by training engine 304 to detect. Typically, this entails the examples in training data 302 to be labeled using class labels in a supervised learning manner, so that ML model 306 is able to apply one or more of those class labels to a new image after deployment. However, training engine 304 may employ other forms of learning approaches that do not require a full set of labeled training data 302, such as unsupervised or semi-supervised techniques.

Non-exhaustive examples of training data 302 may include any or all of the following:

- Images and/or video
- Audio data
- Sensor measurements (e.g., network telemetry such as bandwidth, loss, jitter, etc.)
- Control commands (e.g., for an actuator, a network node, etc.)
- Text
- Etc.

Such training data 302 may be curated either manually by one or more data scientists or in a supervised or semi-supervised manner. Indeed, there are even machine learning-based utilities that can be leveraged for form the set of training data 302 on which ML model 306 is trained.

For simplicity, architecture 300 depicts only a single iteration of model training, resulting in ML model 306. However, as would be appreciated, various steps may be repeated until a finalized ML model 306 is ready for deployment. For instance, ML model 306 may be tested against a validation dataset (not shown) and, based on the performance results, retrained as needed. Model retraining can also be triggered on-demand or automatically, such as when a change in the deployment environment is detected.

Regardless of the specific use case and type of ML model 306, metadata capture engine 308 may operate in parallel with the training by training engine 304 to capture metadata 312 regarding training data 302. To do so, metadata capture engine 308 may assess training data 302 (e.g., its class labels, embedded information, etc.) and/or rely on ancillary data 310 regarding training data 302. For instance, ancillary data 310 may include information regarding the source(s) of training data 302, timestamp and/or geolocation information not already embedded in training data 302.

Using the information included in training data 302 and/or auxiliary data 310, metadata capture engine 308 may form metadata 312 regarding training data 302. Generally, metadata 312 may summarize training data 302. For instance, metadata 312 may include information regarding where, when, and/or how training data 302 was captured, statistics regarding their class labels (e.g., the percentages or fractions of each class label present in training data 302), class imbalances, differences in the proportions of the labels, conditional demographics metrics, any weightings applied to training data 302, etc. In some embodiments, metadata 312 may also include computed bias information, as well, such as a bias report computed using cloud-based services (e.g., Amazon SageMaker Clarify, etc.).

In one embodiment, metadata 312 may also indicate the data sovereignty regulations that apply to training data 302. For instance, training data 302 sourced from countries in the European Union may be governed by the General Data Protection Regulation (GDPR). Based on the source(s) of training data 302, metadata capture engine 308 may also include information about the laws, regulations, etc. governing training data 302 in metadata 312. Indeed, even in instances where training data 302 is kept private, the resulting ML model 306 may still serve as a potential 'leak' of training data 302. Capturing this information in metadata 312 may allow for the controlled usage of ML model 306, such as where and how it is permitted to be used.

Once metadata 312 has been captured, metadata embedding engine 314 may embed metadata 312 into a ledger 316 associated with ML model 306, in various embodiments. In some embodiments, metadata embedding engine 314 may embed ledger 316 into ML model 306, directly. For instance, ledger 316 may be encoded as neurons of a neural network, as specific branches of a decision tree, etc., or otherwise attached in some way to ML model 306 such that the two are transferred together.

In further embodiments, ledger 316 may take the form of a database or distributed ledger that is associated with ML model 306. Such an association could be made, for instance, by tying identifiers for metadata 312 and ML model 306 to one another. For example, in one embodiment, ledger 316 may take the form of an immutable public ledger (e.g., blockchain, etc.) that is referenced within ML model 306.

Figure 4A:
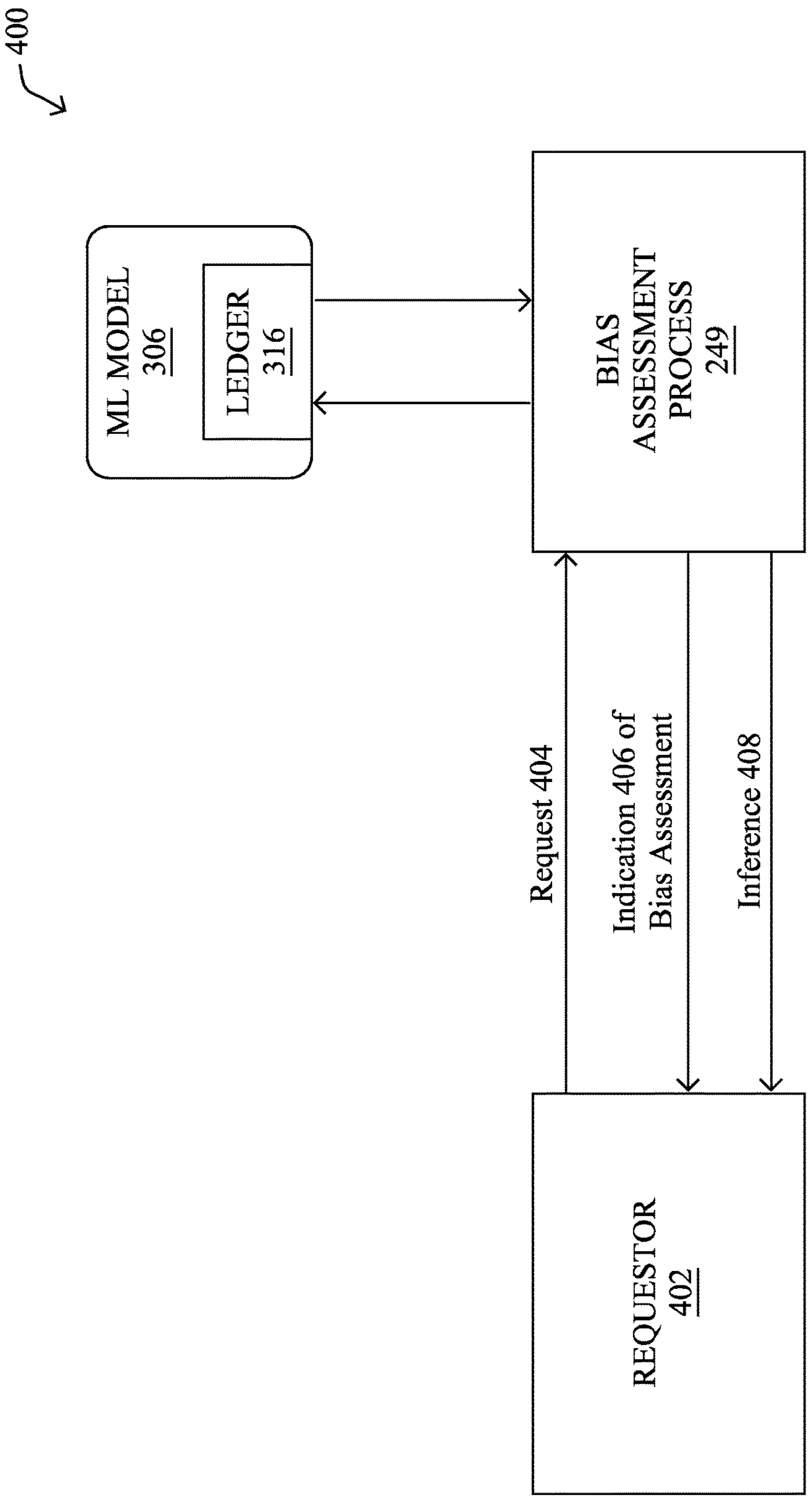
FIGS. 4A-4B illustrate examples architectures for assessing the bias of a machine learning model during use.
Figure 4B:
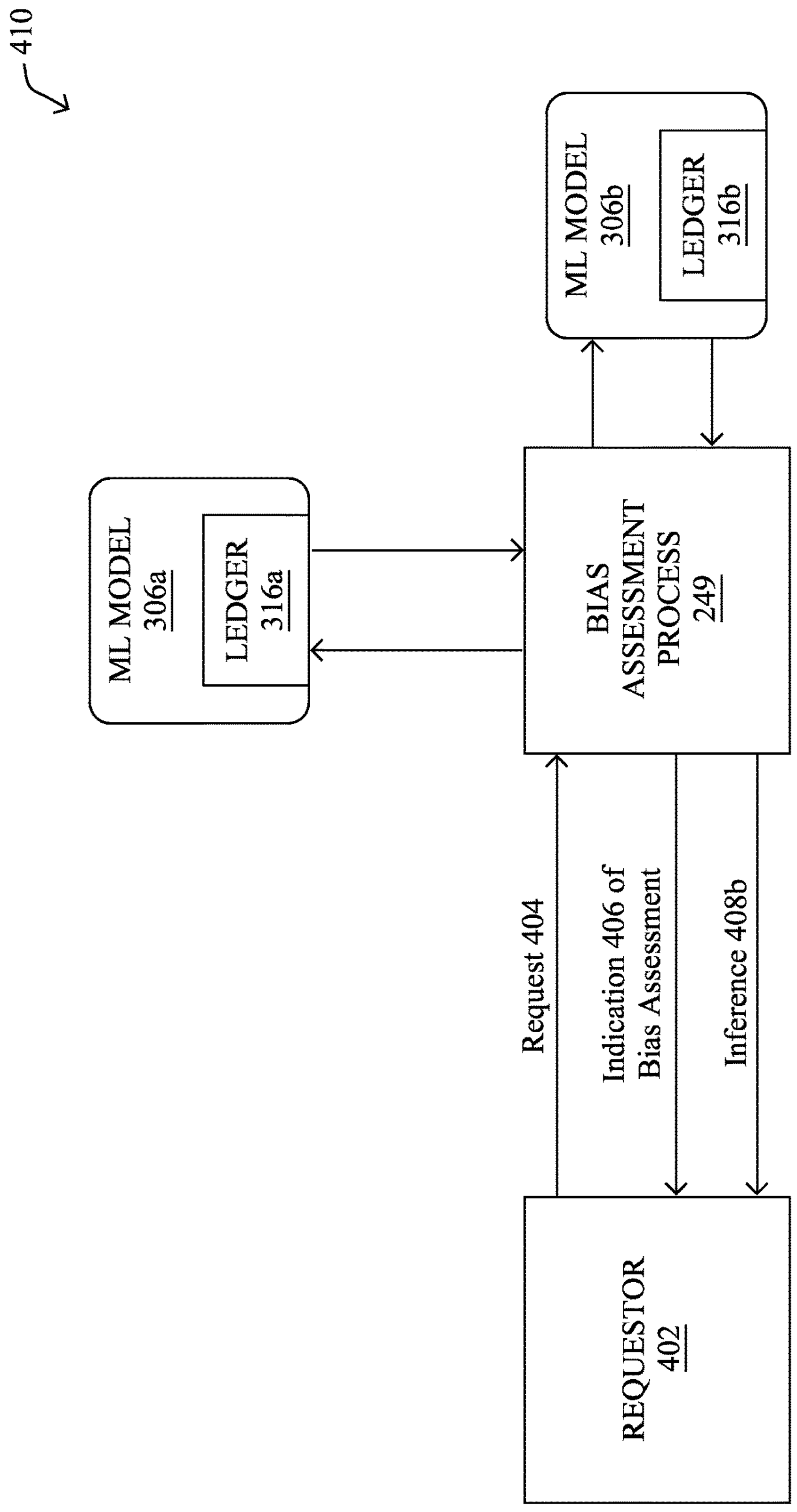

FIGS. 4A-4B illustrate examples architectures for assessing the bias of a machine learning model during use, according to various embodiments. Continuing the example of FIG. 3, assume now that that the training phase for ML model 306 has completed and that it has been deployed for use, such as by a server, mobile device, etc. As shown in FIG. 4A, at the core of architecture 400 is bias assessment process 249, which may execute in conjunction with ML model 306 to assess its bias with respect to any requested use of ML model 306. Accordingly, bias assessment process 249 may be executed either locally by the same device(s) executing ML model 306 or one or more other devices in communication therewith.

During operation, a requestor 402 may send a request 404 for use of ML model 306. For instance, requestor 402 may take the form of a local process being executed by the device(s) also executing bias assessment process 249 and ML model 306 or a separate, remote device, as in the case of bias assessment process 249 and ML model 306 being hosted in the cloud or by one or more servers.

In any case, request 404 may include input data for which requestor 402 wants ML model 306 to make an inference. For instance, if ML model 306 is an image classifier, request 404 may include an image that requestor 402 wants ML model 306 to classify. Typically, the input data in request 404 will be of the same form as the training data used to train ML model 306 (e.g., image data, video data, audio data, text, sensor measurements, etc.).

According to various embodiments, bias assessment process 249 may receive request 404 and perform any or all of the following:

- Compile information about the input data in request 404. This may entail, for instance, extracting any metadata included for the input data (e.g., timestamp information, geolocation information, etc.). In further embodiments, bias assessment process 249 may also make an assessment of the input data to form a set of information about the input data. In some embodiments, this may even entail bias assessment process 249 performing its own classification of the input data to identify certain characteristics of the input data.
- Retrieve the metadata for ML model 306 from ledger 316 (i.e., metadata 312) regarding its training data. As noted previously, this can be done by bias assessment process 249 interacting with ML 306 directly, if ledger 316 is embedded into ML model 306. Alternatively, bias assessment process 249 may retrieve the metadata from a remote ledger, such as from a blockchain.
- Determine the amount of bias ML model 306 would have with respect to the input data included in request 404. To do so, bias assessment process 249 may compare the information that it garnered about the input data to the metadata regarding the training data of ML model 306 that it retrieved from ledger 316.
- In some instances, bias assessment process 249 may also use the metadata that it retrieves from ledger 316 to determine whether use of ML model 306 to service request 404 would violate any data sovereignty rules associated with ML model 306 (e.g., querying a model trained using data from France from the United States).

In various embodiments, bias assessment process 249 may provide an indication 406 of its bias assessment back to requestor 402, such as for display to an end user. Generally, indication 406 may quantify the amount of bias that ML model 306 may exhibit with respect to the input data in request 404. For instance, say that ML model 306 was trained using training data regarding the salaries of male employees, either in full or that the male salaries heavily outnumber those of female employees in the training data for ML model 306. If request 404 request that ML model 306 make an inference about the salaries of female employees, bias assessment process 249 may quantify the bias of ML model 306 in terms of the percentage or fraction of female salaries in the is training data, or complete lack thereof.

In some embodiments, the bias assessment by bias assessment process 249 can also be used to identify situations in which ML model 306 is being used incorrectly. For instance, say that request 404 requests that ML model 306 make an inference about a dog, but its training data only included examples of humans. In such a case, indication 406 could take the form of a warning or alert that ML model 306 is likely being used outside of its intended use. The bias computed by bias assessment process 249 can also be performed for each classification category of ML model 306, in some cases, as well.

In one embodiment, bias assessment process 249 may also report back to requestor 402 any data sovereignty problems that may arise in carrying out request 404. This can be done either as part of indication 406, in conjunction therewith (e.g., as a separate alert), or independently. In some embodiments, bias assessment process 249 may also block use of ML model 306, if doing so violates the data sovereignty policies associated with ML model 306.

In various embodiments, performance of the inference by ML model 306 requested by request 404 may be controlled by the bias assessment(s) by bias assessment process 249. For instance, if the computed bias is above a predefined threshold, bias assessment process 249 may determine that request 404 should not be completed and indicate this as part of indication 406. Alternatively, ML model 306 may still make an inference 408 regarding the input data in request 404 and bias assessment process 249 may return indication 406 in conjunction with inference 408. For instance, say the input data differs from that of the training data of ML model 306 by 15%. In such a case, bias assessment process 249 may still use ML model 306 to make inference 408, but also notify requestor 402 about the computed bias.

In further embodiments, FIG. 4B illustrates a modified architecture 410 based on architecture 400. As shown, assume now that there are two ML models available: ML model **306*a* and ML model 306*b*, each of which is trained using a different training dataset and metadata about their training data is stored in ledgers 316*a*-316*b*, respectively. In such a case, bias assessment process 249 may continue to make its bias and/or data sovereignty assessments for ML model 306*a* with respect to request 404. Here, if there is a data sovereignty concern or the bias exceeds a certain threshold, bias assessment process 249 may still turn to ML model 306*b* to process request 404, assuming that these issues do not exist for ML model 306*b***, as well.

For instance, assume that ML model **306*a* exhibits a bias of 50% for the input data in request 404, but ML model 306*b* exhibits a bias of only 5%. In such a case, bias assessment process 249 may opt to have ML model 306*b* make an inference 408*b* about the input data and return it to requestor 402. In such a case, bias assessment process 249 may still provide indication 406 to requestor 402 for display for ML model 306*a* and/or ML model 306*b***.

Figure 5A:
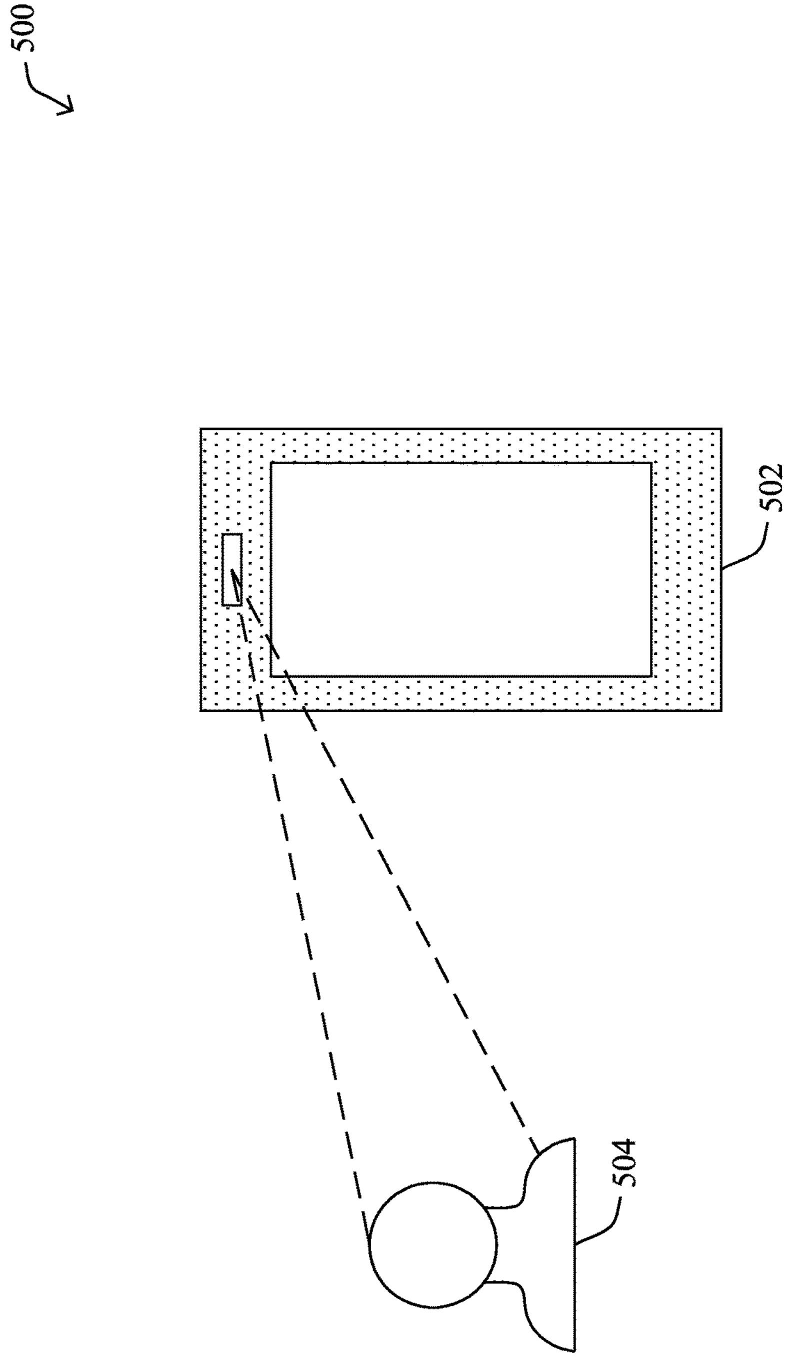
FIGS. 5A-5B illustrate examples of assessing bias during facial recognition.
Figure 5B:
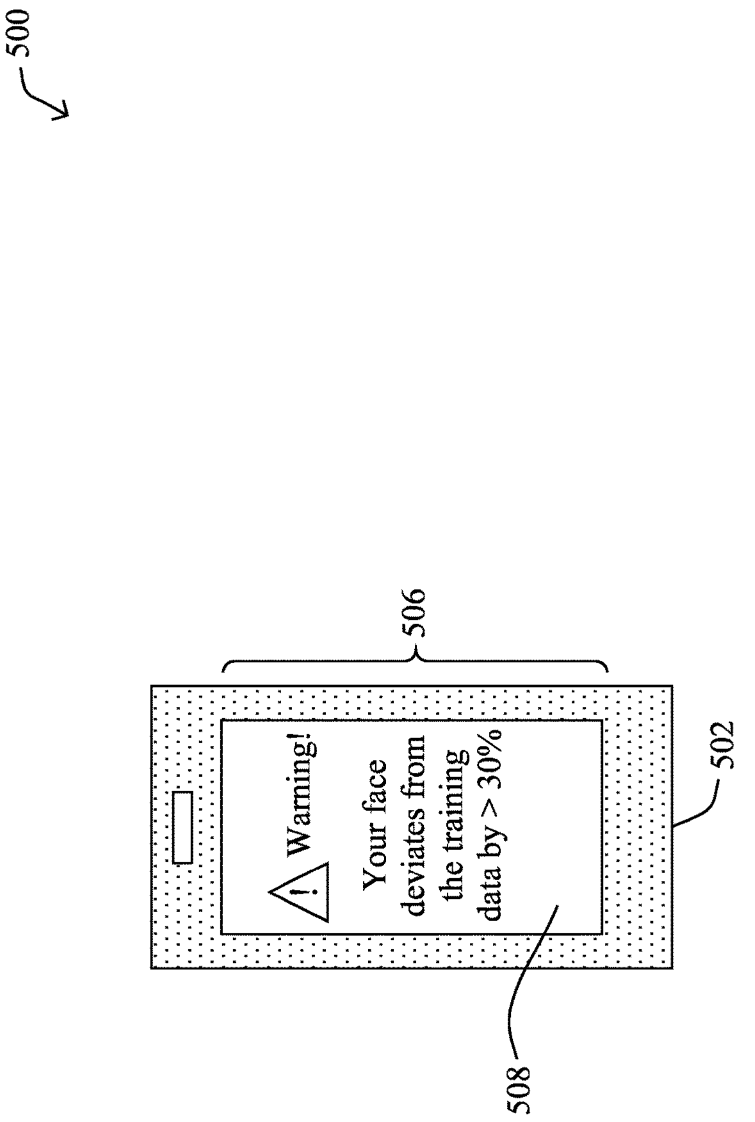

FIGS. 5A-5B illustrate examples of assessing bias during facial recognition, in various embodiments. As shown in FIG. 5A, assume that a mobile device 502 is configured to perform facial recognition for security purposes. Accordingly, mobile device 502 may include a machine learning model trained to perform facial recognition of a user, such as user 504. Further, assume that mobile device 502 also executes bias assessment process 249 to execute in combination with its facial recognition software.

As part of its training, the facial recognition model of mobile device 502 may be trained using various images of people and their faces. One potential property of this training data may be the color of their skin. Accordingly, the metadata stored in the ledger for the ML model of mobile device 502 may include information about the skin tones of the people depicted in its training data (e.g., as histograms of different shades or ranges, percentages, etc.).

When user 504 attempts to access mobile device 502, mobile device 502 may capture an image of user 504 on which its ML model is to make an inference (e.g., "is this an authorized user?"). In other words, mobile device 502 may receive a request to use its machine learning model to make an inference about the captured image of user 504.

In turn, bias assessment process 249 may retrieve the metadata for the training is data of the model and compare it to information about the captured image of user 504. For instance, bias assessment process 249 may determine the skin tone of user 504 from the captured image and compare it to the metadata for the training data used to train the model, to compute its bias.

FIG. 5B illustrates one example of an indication 506 that bias assessment process 249 may provide for display by display 508 of mobile device 502, in response to scanning the face of user 504. Here, indication 506 may comprise a warning that the face of user 504 deviates from the training data of the machine learning model by more than a threshold of 30%, making reliance on the model unreliable. In a further embodiment, indication 506 may also provide additional information, such as a breakdown of the bias across the different classification categories, such as skin tone. Doing so can help user 504 understand why mobile device 502 sometimes fails to unlock itself after performing a facial recognition operation.

Of course, further embodiments also provide for the assessment indications by bias assessment process 249 to be provided back to the developer of the machine learning model for display. For instance, this may allow the developer of the facial recognition software of mobile device 502 to adjust its training data to be more inclusive and retrain the model, accordingly.

Figure 6:
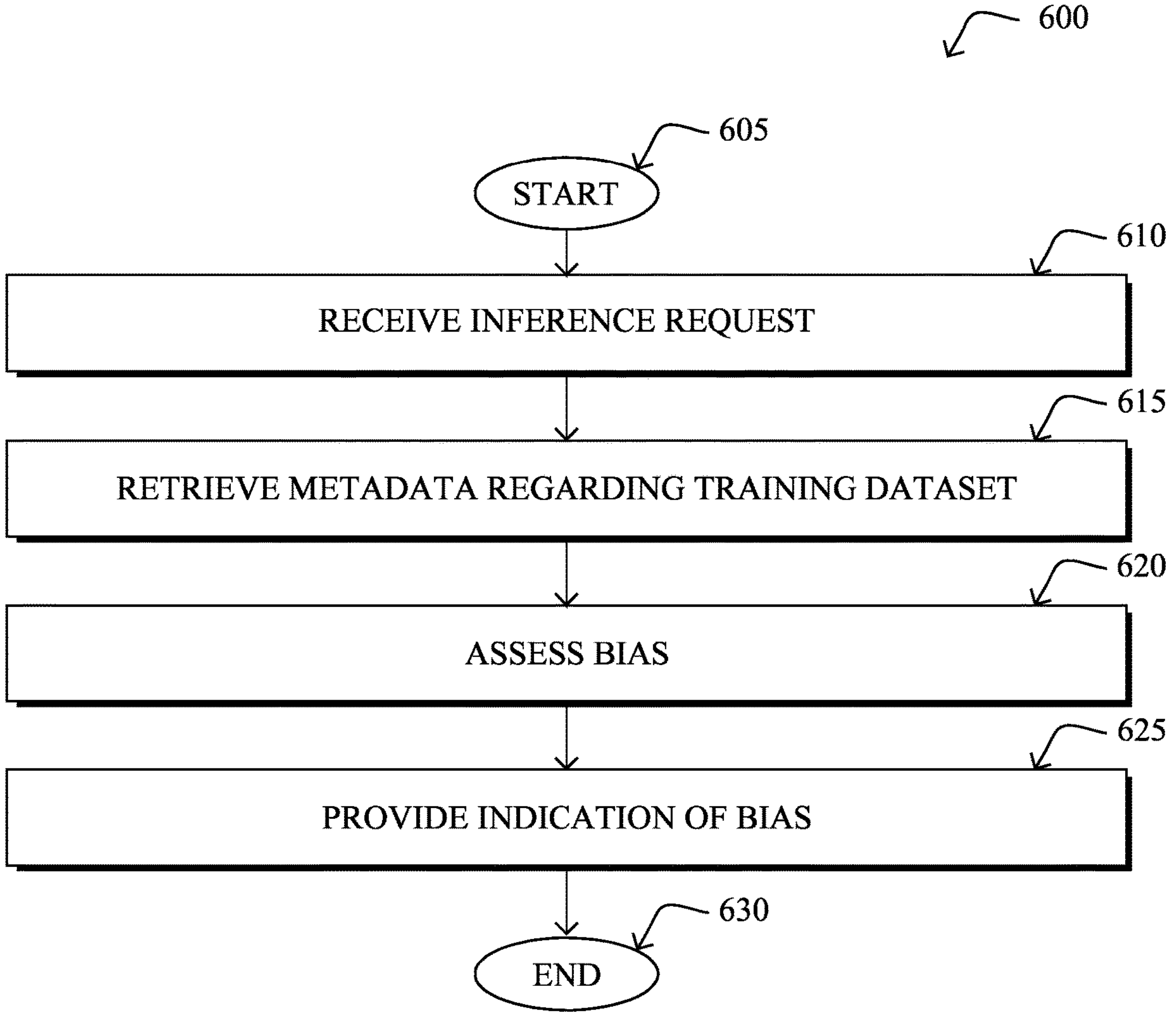
FIG. 6 illustrates an example simplified procedure for assessing machine learning bias using model training metadata.

FIG. 6 illustrates an example simplified procedure 600 (e.g., a method) for assessing machine learning bias using model training metadata, in accordance with one or more embodiments described herein. For example, a non-generic, specifically configured device (e.g., device 200), may perform procedure 600 by executing stored instructions (e.g., bias assessment process 249). The procedure 600 may start at step 605, and continues to step 610, where, as described in greater detail above, the device may receive a request for a machine learning model to make an inference about input data included in the request. In some embodiments, the device may receive the request from a user interface of the device. For instance, the request may take the form of a scan of the face is of the user for purposes of the model performing facial recognition on the image. Thus, in some embodiments, the input data may include an image and the machine learning model may be an image classification model.

At step 615, as detailed above, the device may retrieve metadata regarding training data used to train the machine learning model from a ledger associated with the machine learning model. In one embodiment, the ledger associated with the machine learning model is embedded into the machine learning model. In another embodiment, the ledger associated with the machine learning model comprises a distributed ledger. In one embodiment, the metadata includes geolocation information for the training data used to train the machine learning model. In a further embodiment, the metadata may also include data sovereignty information for the training data.

At step 620, the device may assess bias of the machine learning model by comparing the input data in the request to the metadata from the ledger, as described in greater detail above. In some embodiments, the device may do so by extracting metadata from the input data and comparing the metadata from the input data to the metadata from the ledger.

At step 625, as detailed above, the device may provide an indication of the bias of the machine learning model for display. In one embodiment, the device may also use the machine learning model to make the inference about the input data, whereby the indication of the bias of the machine learning model is presented for display in conjunction with the inference. In one embodiment, the device may make the requested inference about the input data using a second machine learning model, based on the bias of the machine learning model. In another embodiment, the indication of the bias indicates a classification category of the machine learning model and a percentage of deviation between the input data and the training data for that classification category. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for assessing machine learning bias using model training metadata, it is to be understood that various other adaptations and modifications may be made within the spirit and scope of the embodiments herein. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

receiving, at a device, a request for a machine learning model to make an inference about input data included in the request;

retrieving, by the device, metadata regarding training data used to train the machine learning model from a ledger associated with the machine learning model;

comparing, by the device, the input data in the request to the metadata regarding the training data to quantify an amount of deviation between the input data from the training data of the machine learning model when the input data differs from the training data;

determining, by the device, that the amount of deviation indicates that the training data used to train the machine learning model is non-representative of the input data such that the machine learning model has been trained to be biased with respect to making the inference about the input data in the request; and providing, by the device, an indication of the bias of the machine learning model for display based on the deviation of the input data from the training data of the machine learning model.

2. The method as in claim 1, wherein the device receives the request from a user interface of the device.

3. The method as in claim 1, wherein the ledger associated with the machine learning model is embedded into the machine learning model.

4. The method as in claim 1, wherein the ledger associated with the machine learning model comprises a distributed ledger.

5. The method as in claim 1, further comprising:

using the machine learning model to make the inference about the input data, wherein the indication of the bias of the machine learning model is presented for display in conjunction with the inference.

6. The method as in claim 1, wherein the input data comprises an image, and wherein the machine learning model is an image classification model.

7. The method as in claim 1, wherein the machine learning model is a first machine learning model, the method further comprising:

making, by the device, the inference about the input data using a second machine learning model, based on the bias of the first machine learning model.

8. The method as in claim 1, wherein the indication of the bias indicates a classification category of the machine learning model and a percentage of deviation between the input data and the training data for that classification category.

9. The method as in claim 1, wherein the metadata comprises geolocation information for the training data used to train the machine learning model.

10. The method as in claim 1, wherein assessing bias of the machine learning model by comparing the input data in the request to the metadata from the ledger comprises:

extracting metadata from the input data; and comparing the metadata from the input data to the metadata from the ledger.

11. An apparatus, comprising:

one or more network interfaces;

a processor coupled to the one or more network interfaces and configured to execute one or more processes; and a memory configured to store a process that is executable by the processor, the process when executed configured to:

receive a request for a machine learning model to make an inference about input data included in the request;

retrieve metadata regarding training data used to train the machine learning model from a ledger associated with the machine learning model;

compare the input data in the request to the metadata regarding the training data to quantify an amount of deviation between the input data from the training data of the machine learning model when the input data differs from the training data;

determine that the amount of deviation indicates that the training data used to train the machine learning model is non-representative of the input data such that the machine learning model has been trained to be biased with respect to making the inference about the input data in the request; and provide an indication of the bias of the machine learning model for display based on the deviation of the input data from the training data of the machine learning model.

12. The apparatus as in claim 11, wherein the apparatus receives the request from a user interface of the apparatus.

13. The apparatus as in claim 11, wherein the ledger associated with the machine learning model is embedded into the machine learning model.

14. The apparatus as in claim 11, wherein the ledger associated with the machine learning model comprises a distributed ledger.

15. The apparatus as in claim 11, wherein the process when executed is further configured to:

use the machine learning model to make the inference about the input data, wherein the indication of the bias of the machine learning model is presented for display in conjunction with the inference.

16. The apparatus as in claim 11, wherein the input data comprises an image, and wherein the machine learning model is an image classification model.

17. The apparatus as in claim 11, wherein the machine learning model is a first machine learning model, wherein the process when executed is further configured to:

make the inference about the input data using a second machine learning model, based on the bias of the first machine learning model.

18. The apparatus as in claim 11, wherein the metadata comprises data sovereignty information for the training data.

19. The apparatus as in claim 11, wherein the apparatus assesses bias of the machine learning model by comparing the input data in the request to the metadata from the ledger by:

extracting metadata from the input data; and comparing the metadata from the input data to the metadata from the ledger.

20. A tangible, non-transitory, computer-readable medium storing program instructions that cause a device to execute a process comprising:

receiving, at the device, a request for a machine learning model to make an inference about input data included in the request;

retrieving, by the device, metadata regarding training data used to train the machine learning model from a ledger associated with the machine learning model;

comparing, by the device, the input data in the request to the metadata regarding the training data to quantify an amount of deviation between the input data from the training data of the machine learning model when the input data differs from the training data;

determining, by the device, that the amount of deviation indicates that the training data used to train the machine learning model is non-representative of the input data such that the machine learning model has been trained to be biased with respect to making the inference about the input data in the request; and providing, by the device, an indication of the bias of the machine learning model for display based on the deviation of the input data from the training data of the machine learning model.

* * * * *